United States Patent Office 3,009,939
Patented Nov. 21, 1961

3,009,939
HYDROXY PROPOXY PROPYL PHOSPHITES
Lester Friedman, Whitestone, N.Y., assignor to Weston Chemical Corporation, Newark, N.J., a corporation of New Jersey
No Drawing. Filed May 15, 1961, Ser. No. 109,842
7 Claims. (Cl. 260—461)

This application is a continuation-in-part of application Serial No. 56,129, filed September 15, 1960.

This invention relates to tertiary phosphite esters of polypropylene glycols.

The reaction of ethylene glycol and propylene glycol and similar materials with triphenyl phosphite leads to the formation of heterocyclic compounds, Heckenbleikner Patent No. 2,834,798. When using ethylene glycol there are also formed various polymeric products if there are used three moles of ethylene glycol per mole of triphenyl phosphite.

It is an object of the present invention to prepare novel phosphites.

Another object is to prepare linear monomeric tertiary phosphites from polyhydric alcohol.

Still further objects and the entire scope of applicability of the present invention will become apparent from the detailed description given hereinafter; it should be understood however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing tertiary prosphites having the formula

where $R_1$ is

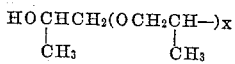

and X is an integer of at least 1 and $R_2$ and $R_3$ are the same as $R_1$ or are aryl or alkyl. Preferably $R_2$ and $R_3$ are the same as $R_1$, i.e., all of them are polypropylene glycol residues. While the $R_1$ grouping is written as

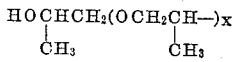

since the vast majority of the groupings present (e.g. about 90%) will have this secondary alcohol relationship, still there will be some units in the product having the

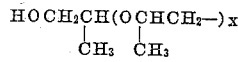

grouping and other units will have the

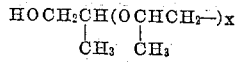

grouping.

Examples of polypropylene glycol phosphites within the present invention are tris-dipropylene glycol phosphite,
tris-polypropylene glycol 425 phosphite,
tris-polypropylene glycol 1025 phosphite,
tris-polypropylene glycol 2025 phosphite,
tris-polypropylene glycol 3000 phosphite,
bis-dipropylene glycol phenyl phosphite,
bis-dipropylene glycol decyl phosphite,
bis-dipropylene glycol p-cresyl phosphite,
bis-dipropylene glycol octadecyl phosphite,
bis-polypropylene glycol 425 phenyl phosphite,
bis-polypropylene glycol 425 decyl phosphite,
bis-polypropylene glycol 1025 octadecyl phosphite,
dipropylene glycol bis-phenyl phosphite,
dipropylene glycol bis-decyl phosphite,
dipropylene glycol bis-octadecyl phosphite,
dipropylene glycol bis o-cresyl phosphite,
polypropylene glycol 425 bis-phenyl phosphite,
polypropylene glycol 1025 bis-decyl phosphite,
dipropylene glycol phenyl decyl phosphite

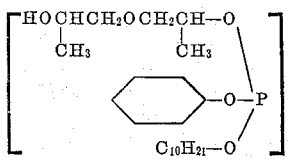

In tris-polypropylene glycol 3000 phosphite X will have a value of about 50.

The new phosphite esters have many uses. Thus, they are stabilizers for polyether polyurethanes against oxidation and degradation (as demonstrated in retarding the yellow or brown color common to such urethanes which have been exposed to air or light) and serve as plasticizers for polyurethanes, etc.

The tris-polypropylene glycol phosphites are particularly useful. Because of their hydroxyl functionability they are excellent for incorporation into urethane systems where they react with the isocyanate end groups in the growing polymer chain and thus become fixed. Due to their functionality they serve to also cross-link and strengthen the polymer chain.

The tris-polypropylene glycol phosphites can also be incorporated into epoxy resin systems. Thus, tris-dipropylene glycol phosphite can react directly in an epoxy system catalyzed preferably by an alkyl aminate. The tris polypropylene glycol phosphite can be pre-reacted with maleic anhydride or other polybasic acid or anhydride to give the corresponding acid ester phosphite ester which can react in many epoxy systems without additional catalyst.

The tris polypropylene glycol phosphites also can be employed to form polyesters, e.g., by reaction, e.g. mole for mole with maleic anhydride, phthalic anhydride, dimethyl terephthalate, fumaric acid, succinic acid, oxalic acid, itaconic acid, etc.

The novel phosphites are also useful as lubricants, heat transfer fluids, hydraulic fluids and pump fluids. They have good fluid properties, are insoluble in water and have in effect a built-in stabilizer and acid acceptor. They are also suitable as plasticizers in polyester systems and free radical formed systems, e.g., polymerized methyl methacrylate. They can be used in existing glycol type lubricants and fluids.

The polypropylene glycol phosphites are prepared by transesterifying a triaryl phosphite or a trialkyl phosphite with a polypropylene glycol. To prepare a tris polypropylene glycol phosphite at least 3 moles of polypropylene glycol should be employed per mole of triaryl or trialkyl phosphite. Preferably a slight excess of the polypropylene glycol is employed. To prepare bis polypropylene glycol mono aryl or mono alkyl phosphites only two moles of polypropylene glycol are employed per mole of triaryl or trialkyl phosphite. To prepare mono polyproylene glycol bis aryl or bis alkyl phosphites only one mole of polypropylene glycol is employed per mole of triaryl or trialkyl phosphite. When less than three moles of polypropylene glycol are employed per mole of triaryl or trialkyl phosphite there is some tendency for polymer formation as a by-product. Such by-products can be used in the same manner as the monomeric products.

As the polypropylene glycol there can be employed dipropylene glycol, polypropylene glycol 425 (polypropylene glycol having an average molecular weight of 425), polypropylene glycol 1025 (polypropylene glycol having an average molecular weight of 1025), polypropylene glycol 2025 (polypropylene glycol having an average molecular weight of 2025) and polypropylene glycol having an average molecular weight of 3000 or mixtures thereof.

As the triaryl or trialkyl phosphite there can be used for example triphenyl phosphite tri-o-cresyl phosphite, tri-p-cresyl phosphite, tri-m-cresyl phosphite, tri-xylenyl phosphite, tri-decyl phosphite, diphenyl decyl phosphite, and tri-ethyl phosphite.

The reaction can be catalyzed by alkaline catalysts, e.g., 0.1–1.0% of sodium phenolate, sodium cresylate, potassium phenolate, sodium methylate, sodium decylate, sodium dipropylene glycolate or the like, or can be catalyzed with a diaryl or dialkyl phosphite, e.g., 0.1–1% of diphenyl phosphite, di-o-cresyl phosphite, di-p-cresyl phosphite, dimethyl phosphite, diethyl phosphite, didecyl phosphite, di-octadecyl phosphite, etc.

When alkaline catalysts are employed preferably they have a pH or at least 11 in a 0.1 N solution.

Due to the fact that the alcohol groups in dipropylene glycol (and the other polypropylene glycols) are secondary and hence relatively slow in reacting, it is possible to prepare the tris polypropylene glycols having three functional hydroxyl groups with a minimum of cross-linking or polymerization. The tris polypropylene glycol products are insoluble and not subject to hydrolytic attack by water.

The higher polypropylene glycol phosphites can be prepared by reacting tris dipropylene glycol phosphite with propylene oxide. Reaction occurs at the free hydroxy sites and a tris polypropylene glycol phosphite results.

Unless otherwise indicated, all parts and percentages are by weight.

EXAMPLE 1

*Tris dipropylene glycol phosphite*

Triphenyl phosphite 3100 grams (10 moles), diphenyl phosphite 15 grams (catalyst) and dipropylene glycol 4422 grams (33 moles, a 10% excess) were heated in vacuo (10 mm.) at 120° C. Phenol was collected (B.P. 85–90° C. 10 mm.). As the reaction proceeded the pot temperature was allowed to rise to 155°±5° C. During this time, the distillate consisted of pure phenol until about 80% of the theoretical amount was collected. Thereafter, it was contaminated with increasing amounts of dipropylene glycol. The reaction was completed when 3250 grams of combined distillate was obtained. The pot residue after filtration through Filtercel (diatomaceous earth) was tris dipropylene glycol, a viscous colorless liquid and had an $n_D^{25}$ 1.4610, sp. gr.$^{25}$ 1.097.

EXAMPLE 2

*Tris polypropylene glycol 425 phosphite*

In the same manner as Example 1 there were reacted triphenyl phosphite 3100 grams (10 moles), diphenyl phosphite 15 grams (catalyst) and polypropylene glycol 425 in an amount of 12,750 grams (30.3 moles). Heating was continued until 2780 grams of phenol (97% of theory) were recovered. The tris polypropylene glycol 425 phosphite left in the pot was a colorless viscous liquid and had an $n_D^{25}$ 1.4535 and a $D_4^{25}$ 1.028.

EXAMPLE 3

Polypropylene glycol 1025 (9235 grams, 9.09 moles), triphenyl phosphite (930 grams, 3 moles) and diphenyl phosphite (20 grams, catalyst) were heated together in vacuo with stirring to a temperature of 210° C. and 5 mm. pressure. Phenol, M.P. 40° C. was collected (816 grams). The mixture was then swept with nitrogen for 2 hours at 210–220° C. 10 mm. pressure to complete the phenol distillation. An additional 34 grams was collected. Total yield of phenol, 850 grams (846 grams theoretical +18 grams from catalyst or a total of 864). The pot residue was allowed to cool to 150° C. treated with clay and filtered to give tris-polypropylene glycol 1025 phosphite in almost theoretical yield a liquid having the following properties: $n_D^{25}$ 1.4515, sp. gr.$_{15}^{25}$ 1.022.

EXAMPLE 4

In a similar manner polypropylene glycol 2025 (18,216 grams, 9.09 moles), triphenyl phosphite (930 grams, 3 moles) and diphenyl phosphite (50 grams catalyst) were reacted to give tris-polypropylene glycol 2025 phosphite in almost theoretical yield as a liquid having the properties: $n_D^{25}$ 1.4501, sp. gr.$_{15}^{25}$ 1.006.

EXAMPLE 5

Dipropylene glycol (884 grams, 616 moles) 10% excess, triphenyl phosphite (610 grams, 2 moles) and sodium (0.5 g. dissolved in a little dipropylene glycol) was reacted as described in Example 1. About 90% of the phenol was distilled out from the reaction mixture free of co-distilled dipropylene glycol. Towards the end of the reaction of a mixture of phenol and glycol was obtained. The pot residue after treatment with clay and subsequent filtration was identical in every respect to material prepared as per Example 1.

The use of alkaline catalysts also can be employed with higher polypropylene glycols to make the phosphite esters.

What is claimed is:

1. 

where $R_1$ is

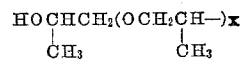

and X is an integer of between one and about 50 and $R_2$ and $R_3$ are selected from the group consisting of $R_1$, alkyl and aryl.

2. Tris polypropylene glycol phosphite.

3. Tris dipropylene glycol phosphite.

4. Tris polypropylene glycol phosphite wherein the polypropylene glycol unit has an average molecular weight of 425.

5. Tris polypropylene glycol phosphite wherein the polypropylene glycol unit has an average molecular weight of 1025.

6. Tris polypropylene glycol phosphite wherein the polypropylene glycol unit has an average molecular weight of 2025.

7. Tris polypropylene glycol phosphite wherein the free hydroxyl groups are secondary alcohol groups.

References Cited in the file of this patent

UNITED STATES PATENTS

| | | |
|---|---|---|
| 2,326,140 | Gzemski | Aug. 10, 1943 |
| 2,353,558 | Gzemski | July 11, 1944 |
| 2,372,244 | Adams et al. | Mar. 27, 1945 |
| 2,728,790 | Sroog | Dec. 27, 1955 |
| 2,841,608 | Hechenbleikner et al. | July 1, 1958 |

UNITED STATES PATENT OFFICE
CERTIFICATION OF CORRECTION

Patent No. 3,009,939                                      November 21, 1961

Lester Friedman

It is hereby certified that error appears in the above numbered patent requiring correction and that the said Letters Patent should read as corrected below.

Column 1, line 34, for "prosphites" read -- phosphites --; same column 1, lines 41 and 42, 49 and 50, and 55 and 56, and column 4, lines 45 and 46, the formula, each occurrence, should appear as shown below instead of as in the patent:

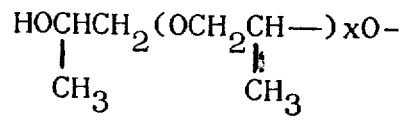

column 3, line 49, for "155°+5° C." read -- 155°±5° C. --; line 56, after "glycol" insert -- phosphite --.

Signed and sealed this 17th day of April 1962.

(SEAL)
Attest:

ESTON G. JOHNSON
Attesting Officer

DAVID L. LADD
Commissioner of Patents